Figure 1:
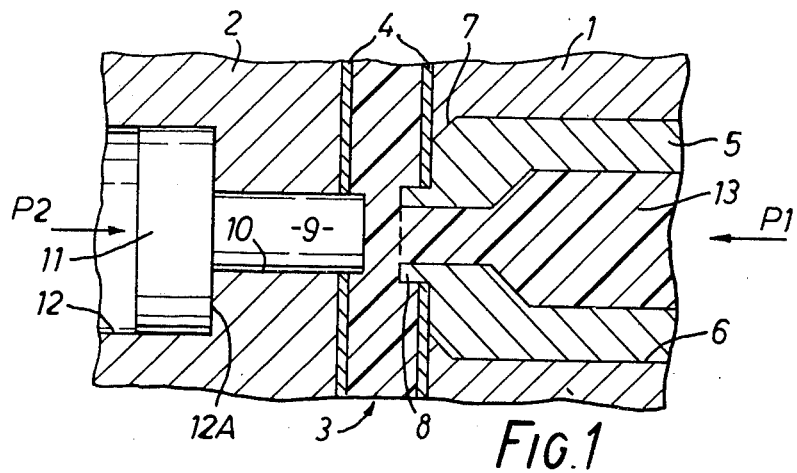

United States Patent [19]

Simmons

[11] 3,937,779
[45] Feb. 10, 1976

[54] MOULDING OF GRAMOPHONE RECORDS

[75] Inventor: John Ernest Simmons, Ruislip, England

[73] Assignee: EMI Limited, Hayes, England

[22] Filed: Feb. 3, 1975

[21] Appl. No.: 546,760

Related U.S. Application Data

[63] Continuation of Ser. No. 356,180, May 1, 1973, abandoned.

[30] Foreign Application Priority Data

May 3, 1972 United Kingdom............... 20513/72

[52] U.S. Cl. ................ 264/106; 264/154; 264/161; 264/163

[51] Int. Cl.² ........................................ B29D 17/00

[58] Field of Search .......... 264/106, 107, 154, 161, 264/163

[56] References Cited
UNITED STATES PATENTS

| | | | |
|---|---|---|---|
| 2,613,395 | 10/1952 | Massler............................ | 264/106 X |
| 2,698,460 | 1/1955 | Amo................................ | 264/161 X |
| 3,649,728 | 3/1972 | Honsho............................ | 264/163 X |
| 3,671,158 | 6/1972 | Rand................................ | 264/90 X |

Primary Examiner—Richard R. Kucia
Attorney, Agent, or Firm—Fleit & Jacobson

[57] ABSTRACT

In a method of moulding gramophone records, the hole is formed by co-operating hole forming members which can extend into the mould cavity and which are pressed together at a position within the thickness of the record. One of the members is subsequently extended further and moves beyond this position, so that any web or flash which may be formed between the hole forming members is separated from the article after which the mould cavity opened and the article is removed. The machine described is for the injection moulding of gramophone records and one of the hole forming members is the nozzle tip of the injection nozzle. The other hole forming member is a counterpiece, which is the member which undergoes the further extension by pushing back the nozzle tip upon decompression of the mould cavity.

4 Claims, 4 Drawing Figures

MOULDING OF GRAMOPHONE RECORDS

This is a continuation application of U.S. Ser. No. 356,180, filed May 1, 1973 and now abandoned.

This invention relates to the moulding of apertured articles in which an aperture is formed in the article during formation of the article in the mould cavity, and especially but not exclusively to the formation of a centre hole in a gramophone record during formation of the record in the mould cavity.

It is an object of the invention to provide an improved method of moulding apertured articles.

According to one aspect of the invention there is provided a method of moulding an apertured article including the steps of forming an aperture in the article during formation of the article in a mould cavity by causing co-operable hole forming members in respective mould parts to press together at a position within the thickness of the article subsequently moving one of said hole forming members beyond said position, and thereafter opening the mould cavity and removing the apertured article therefrom.

According to another aspect of the invention there is provided apparatus for moulding an apertured article comprising first and second mould parts, means for causing said mould parts to close together to define a mould cavity, co-operable hole forming members in respective mould parts, means for causing said co-operable hole forming members to press together within the thickness of an article being moulded in said cavity, one of said hole forming members being such that it does not extend to its fullest amount into said cavity when said co-operable hole forming members are first pressed together to form said aperture, and means for subsequently causing said one hole forming member to extend further into said cavity and move beyond the position at which said co-operable hole forming members are first pressed together.

The invention is especially suited to the injection moulding of gramophone records in which case one of said hole forming members may be the tip of the injection nozzle and the other of said hole forming members may be a co-operable counterpiece or anvil.

Figure 2:
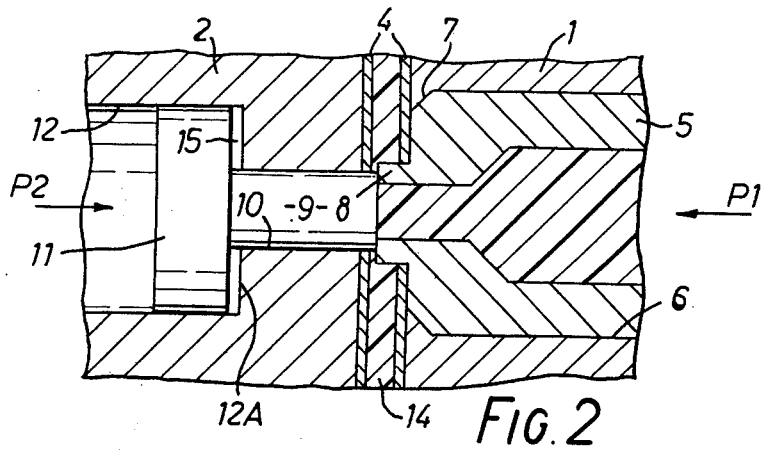
Figure 3:
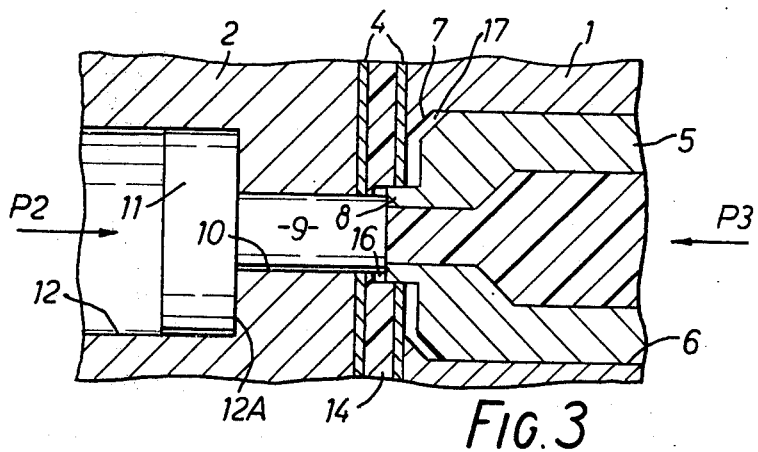
Figure 4:
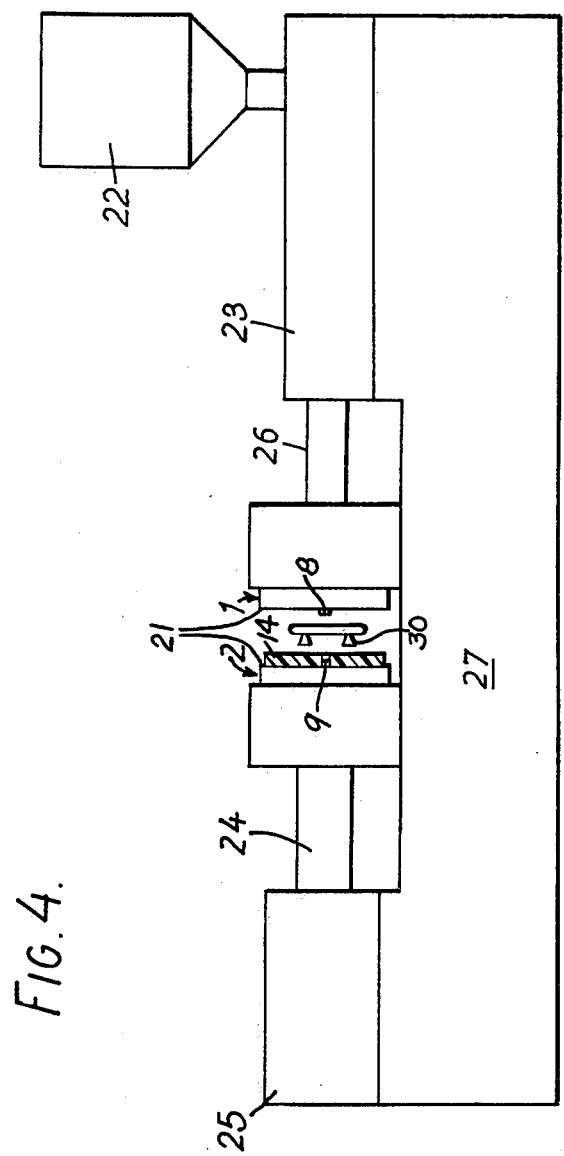

In order that the invention may be clearly understood and readily carried into effect one example thereof will now be described with reference to the accompanying drawings, in which:

FIGS. 1, 2 and 3 illustrate diagrammatically sectional views of the centre portion of a mould cavity at various stages in the formation of an apertured gramophone record in accordance with the invention, and FIG. 4 illustrates schematically injection moulding apparatus for the manufacture of gramophone records in accordance with the invention.

Referring firstly to FIG. 4, reference numerals 1 and 2 indicate generally the fixed and movable mould parts respectively. Matrices are secured to the faces 21 of the mould parts 1 and 2. A hopper 22 contains a supply of record material, for example in grannular form, which is fed to a heater and screw feeder 23 to which is secured an injection barrel 26. In practice, the heater is required only to produce the initial softening of the record material which is maintained in a softened state by the energy supplied by the screw feeder. The movable mould part 2 is reciprocated along guides (not shown) by a ram 24 under the influence of a hydraulic cylinder 25. The mouldable material is fed through the fixed mould part 1 into the centre of the mould cavity through the injection barrel 26 to which is secured a nozzle having a nozzle tip 8. The movable mould part 2 carries a counterpiece or anvil 9 co-operable with the nozzle tip 8. The various elements of the machine are mounted on a bed 27.

Referring now more particularly to FIGS. 1 to 3 of the drawings, there is shown an enlarged view of part of the apparatus for the injection moulding of gramophone records. The two mould parts 1 and 2 have matrices attached thereto. (The matrices do not appear in any of FIGS. 1 to 3 which show only a small portion of the centre of the mould parts. Mould part 1 is fixed while mould part 2 is reciprocable towards and away from mould part 1 by any suitable known means. The mould parts define a mould cavity indicated generally by the reference numeral 3. Each mould part carries a record label 4. An injection nozzle 5 is reciprocable in a bore 6 in the fixed mould part 1. In the forward position, the nozzle 5 engages a conical seating portion 7 of the mould part 1. The nozzle 5 has a tip 8 which can extend into the mould cavity 3 and which holds one of the labels 4 centrally against the fixed mould part 1. A counterpiece or anvil member 9 is reciprocable in a bore 10 in the movable part 2 and can extend into the mould cavity 3 to co-operate with the nozzle tip 8 in the formation of the centre hole of a gramophone record. The counterpiece 9 has an enlarged head 11 slidable in a bore 12 having a front shoulder 12A which determines the extent to which the counterpiece can extend into the mould cavity. The counterpiece 9 also serves to hold the other record label 4 against the movable mould part 2.

An operating cycle will now be described for the manufacture of a gramophone record. With the nozzle tip 8 and the counterpiece 9 in their forward or extended positions (i.e. with the nozzle 5 engaging seating 7 in the mould part 1 and with the head 11 of the counterpiece 9 engaging the shoulder 12A in the mould part 2) a record label 4 is placed and held against a respective mould part by nozzle tip 8 and counterpiece 9. Mould part 2 is moved towards mould part 1 and mouldable material 13 is introduced between the record labels 4 through the nozzle 5, to reach the stage shown in FIG. 1 where the mould parts have not yet closed together.

As mould part 2 closes on mould part 1 to the position shown in FIG. 2, the mouldable material flows radially outwardly to fill the mould cavity 3 and produce a gramophone record 14. At the same time, the extended counterpiece 9 engages the nozzle tip 8 to form a hole in the centre of the record. The counterpiece 9 is of such a length that it engages the nozzle tip 8 before the mould part 2 completes its travel. The force $P_1$ holding the nozzle 5 in its forward position is greater than the force $P_2$ employed to hold the counterpiece 9 in its forward position. Hence when the counterpiece engages the nozzle tip, it stops. The mould part 2, however, continues its travel to complete the formation of the record 14. A space 15 is produced between the head 11 of the counterpiece 9 and the shoulder 12A, as can be seen in FIG. 2. Typical forces $P_1$ and $P_2$ applied to the nozzle 5 and the counterpiece 9 are 2 Tons and 1½ Tons respectively. Even with the application of such forces, a thin web or flash may be formed between the nozzle tip 8 and the counterpiece 9. The present invention ensures that if any such flash is formed it is removed before the mould cavity is opened so that when the record is removed it has a neat clean centre hole. This is effected by reducing the force $P_1$ applied to the nozzle 5 to a value $P_3$, typically zero, which is lower than the force $P_2$ applied to the counterpiece 9. The nozzle is moved by the counterpiece until the head 11 engages the shoulder 12A thus forming gaps 16 and 17, as can be seen in FIG. 3.

It is desirable in the mass production of articles, such as gramophone records, to reduce the over-all cycling time of the machine as far as possible. In practice, therefore, the mould cooling cycle is usually terminated before the mouldable material is fully hardened. In view of this, in the preferred method, the force $P_1$ is reduced to the value $P_3$ upon decompression of the mould cavity. If the force $P_1$ were reduced while the mould cavity was still under moulding pressure, distortion would probably occur due to the mouldable material tending to flow into the gaps 16 and 17. However, it will be appreciated that the force $P_1$ may be reduced while the mould cavity is still under moulding pressure if the other parameters, such as choice of moulding material and cooling cycle, are such that distortion does not occur.

Since the nozzle 5, the injection barrel 26 and the screw feeder 23 are secured together as a rigid unit, they all move backwards when the counterpiece 9 pushes the nozzle tip 8 backwards upon the reduction of the force $P_1$ to the value $P_3$.

When the mould parts 1 and 2 separate, air or other gas may be introduced into the space 17 at atmospheric or greater pressure to assist in releasing the record from the fixed mould part 1 so that it remains attached to the movable mould part 2 from which it is subsequently removed. It is necessary for automatic operation to ensure that the record is always retained on a particular one of the mould parts when the mould parts separate. In this example, the record is retained on the movable mould part. In the absence of the additional movement of the counterpiece 9 beyond the position at which it meets the nozzle tip 8, the formation of a web or flash across the aperture was found to hinder release of the record from the mould part 1 since the web remained connected to the sprue in the nozzle tip. Use of the invention was found to greatly assist in the release of the record from mould part 1. This is of great advantage whichever mould part is arranged to retain the record when the mould parts separate.

The initial movement of the counterpiece 9 when the force on the nozzle 5 is reduced need only be sufficient to remove any flash which may be formed, for example 0.020 inches. In the above described example, this would mean that the space 15 was 0.020 inches, and that the sum of the extensions into the cavity of the nozzle tip 8 and the counterpiece 9 is 0.020 inches greater than the thickness of the centre portion of the gramophone record 14. In the position shown in FIG. 2, the counterpiece 9 may extend into the cavity by any suitable amount say 0.030 inches.

Although the invention has been described with reference to the injection moulding of gramophone records, it will be appreciated that the invention is applicable to the formation of other apertured articles.

It will have been noted that the nozzle tip 8 and the counterpiece 9 are of different diameters in the above described example. This feature is described and claimed in our co-pending British Pat. Specification 1367680.

In this example, the counterpiece 9 is of a diameter equal to the desired centre hole and the nozzle tip 8 is of slightly greater diameter. The member which undergoes the additional extension is the one with the smaller diameter, both in the case of injection moulding and in the case of compression moulding from a cake of material.

What I claimed is:

1. A method of moulding a gramophone record including the steps of introducing mouldable material into a mould cavity between first and second mould parts through a nozzle tip which also acts as a hole-forming member and forming an aperture in the record during the formation of the record in said mould cavity by causing said first and second co-operable hole-forming members in respective mould parts to press into contact at a position within the thickness of the record, thereby to form the hole, subsequently moving one of said hole-forming members beyond said position to sever any thin web remaining at said nozzle tip, and thereafter opening the mould cavity and removing the apertured record therefrom.

2. A method according to claim 1 and including the step of decompressing the mould cavity before opening the cavity, at which step said movement of the one hole-forming member is effected.

3. A method according to claim 1 in which said one hole forming member is caused to move beyond said position by reducing the force applied to the other of said hole forming members to a value below the force applied to said one hole forming member.

4. A method according to claim 1 in which said one hole forming member is of smaller diameter than the other of said hole forming members.

* * * * *